United States Patent [19]

Knobloch

[11] 3,876,668

[45] Apr. 8, 1975

[54] TRICHLOROTRIMELLITIC ANHYDRIDE AND ITS PREPARATION

[75] Inventor: James O. Knobloch, Naperville, Ill.

[73] Assignee: Standard Oil Company, Chicago, Ill.

[22] Filed: Dec. 29, 1972

[21] Appl. No.: 319,501

[52] U.S. Cl. ............. 260/346.3; 260/78.4; 260/475
[51] Int. Cl. ............................................. C07c 63/00
[58] Field of Search ................................. 260/346.3

Primary Examiner—Henry R. Jiles
Assistant Examiner—Mildred A. Crowder
Attorney, Agent, or Firm—Gunar J. Blumberg; Arthur G. Gilkes; William T. McClain

[57] ABSTRACT

Trichlorotrimellitic anhydride, a new composition of matter, is prepared by chlorination of 2,6-naphthalene dicarboxylic acid in oleum in the presence of an iodine catalyst.

3 Claims, No Drawings

TRICHLOROTRIMELLITIC ANHYDRIDE AND ITS PREPARATION

BACKGROUND OF INVENTION

The recent growth in the use of flammable materials has increased the incidences of damage and personal injury by fire. Concern for public safety has prompted government agencies to impose stricter flammability standards for those applications where synthetic materials are used. As a result, the use of halogen containing compounds, particularly chlorine and bromine containing compounds as additives or as an integral part of a finished polymer to impart fire retardant properties to polymeric materials is a rapidly growing industry of great commercial importance. Such compositions can be utilized in those areas of application where fire is likely to occur and to prevent substantial danger or hazard to individuals or property. Examples of such applications are the use of polymeric material in household appliances, building materials, the auto industry, the aircraft industry, and others. The seriousness of the potential danger from combustible materials has spurred activity on the part of various government regulatory bodies. Thus, several government agencies are setting flammability standards for autos, aircraft, carpets and other articles made from synthetic polymeric materials. In response to these pressures, makers of synthetic polyester materials are increasing their efforts to impart flame retardant properties to their product.

An object of this invention is to provide an intermediate compound, containing chlorine, that may be used to form fire retardant products. Such products would include synthetic polyesters that may find use in a variety of applications where a high degree of flame retardance or self-extinguishing properties are desirable or necessary.

SUMMARY OF INVENTION

My invention relates to a method to prepare the new composition of matter, trichlorotrimellitic anhydride by chlorinating 2,6-naphthalene dicarboxylic acid in oleum in the presence of an iodine catalyst. My novel compound may be represented by the following structure.

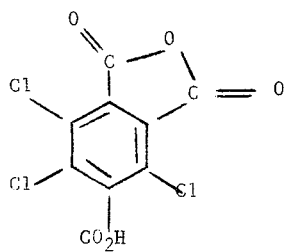

This novel compound may best be prepared by dissolving a quantity of 2,6-naphthalene dicarboxylic acid in fuming sulfuric acid, adding iodine to the solution, and allowing chlorine gas to bubble through the mixture. The mixture is held at a temperature of from about 55°C to about 100°C during the reaction. The preferred reaction temperature is between about 80° to about 95°C. The reaction solution is then poured on ice, whereupon a yellow suspension is formed. The suspension is extracted with anhydrous ether, and dried over magnesium sulfate.

The preparation of my novel compound may be more specifically illustrated by the following sample.

EXAMPLE

A 15.4 gram sample of 2,6-naphthalene dicarboxylic acid was dissolved in 162.9 grams of 104.5% sulfuric acid. 0.1275 grams of iodine were added. The solution was contained in a 300 ml, 4-neck, round bottom flask equipped with a thermometer placed in the liquid phase, a reflux condenser that had a sulfuric acid bubbler attached as a moisture trap, a motor driven paddle stirrer and a chlorine inlet line dipping into the liquid. The flask was heated to 66°C by a mantle to dissolve the 2,6-naphthalene dicarboxylic acid, and was protected from light by an aluminum foil shield wrapped around it. The apparatus was weighed at intervals to follow the progress of chlorination. Chlorine was allowed to bubble through the solution. The temperature rose to 90°C during the first 1.5 hours and remained between 85°–95°C for the remainder of the reaction. After 6 hours, weighing the apparatus showed a weight increase of 12.7 grams. At this point 0.1237 grams of additional iodine was added. After 13 hours of total reaction time reweighing revealed a decrease in weight of 3.0 grams, establishing the over-all weight increase at 9.7 grams. At this point 0.1311 grams of additional iodine was added. After 19 hours of total reaction time a final weighing revealed an additional loss in weight of 5.2 grams, establishing the net total weight increase of the solution at 4.5 grams. At this point the reaction was terminated.

The resulting solution was poured on ice yielding a 700 cc. yellow suspension. The yellow suspension was then extracted with three 200 cc. portions of anhydrous ether, each of which was washed with 10 cc. of water. The combined ether extracts were dried over magnesium sulfate and filtered. The ether was then removed leaving a residue of 13.2 grams.

This viscous oily solid was partitioned between 8% caustic and ether. The ether removed only 0.1g after solvent removal. The basic solution was acidified with hydrochloric acid and the organic acids were extracted into ether. After drying and ether removal, 11.0g of a dark yellow solid was obtained. This was called "crude product."

A sample of the crude product was methylated with diazomethane and examined in a mass spectrometer. Based on the low voltage spectrum ion percent values, the major component contained in the crude product was the trimethyl ester of trichlorotrimellitic acid and the minor component (9.3% of the major component) was dimethyl dichlorotrimellitate.

To further establish that the crude product actually was the substituted trimellitic acid (which would normally be expected from the oxidative opening of one of the aromatic rings), a sample of the crude product was sublimed under a vacuum; 94% sublimed as a light yellow solid that melted 219°–233°C. The sublimate was directly subjected to mass spectrometric examination. This revealed the major component to be trichlorophthalic anhydride. As expected, trichlorophthalic anhydride resulted from decarboxylation in the mass spectrometer of the free acid group of the substituted trimellitic anhydride. The dichlorotrimellitic anhydride also decarboxylated and dichlorophthalic anhydride was observed in about 10 percent of the amount of trichlorophthalic anhydride. These products establish the vicinal location of two of the carboxyl groups.

The sublimate was then methylated with diazomethane. The mass spectrum showed trimethyl trichlorotrimellitate as the major product with 14 percent as much trimethyl dichlorotrimellitate. Thus the sublimate reacted with methanol present in the ether solution of diazomethane to open the anhydride rings and form the trimethyl esters.

According to my novel invention 2,6-naphthalene dicarboxylic acid is dissolved in fuming sulfuric acid and reacted with chlorine in the presence of an iodine catalyst. The chlorine will react with 2,6-naphthalene dicarboxylic acid to form trichlorotrimellic anhydride. The use of 2,6-naphthalene dicarboxylic acid as the starting material allows the chlorination to proceed rapidly and easily. Trimellitic anhydride may not be used as the starting material. When trimellitic anhydride was used as the starting material and chlorination was attempted under similar conditions as described in Example 1 it was found that no chlorinated product resulted, and trimellitic acid was recovered. Therefore, trimellitic anhydride cannot be chlorinated directly under the reaction conditions set forth for my invention.

What I claim is:

1. Trichlorotrimellitic anhydride, said compound being represented by the following structural formula:

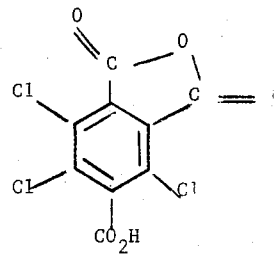

2. A process for preparing trichlorotrimellitic anhydride, wherein 2,6-naphthalene dicarboxylic acid is chlorinated in fuming sulfuric acid, in the presence of an iodine catalyst, at a temperature in the range of between about 50°C and about 100°C.

3. A process for preparing trichlorotrimellitic anhydride, as claimed in claim 2, wherein the reaction temperature is held at between about 80°C to about 95°C.

* * * * *